March 15, 1932.  J. M. CULLEY, JR  1,849,660
BRAKE LINING STRETCHER
Filed June 8, 1929
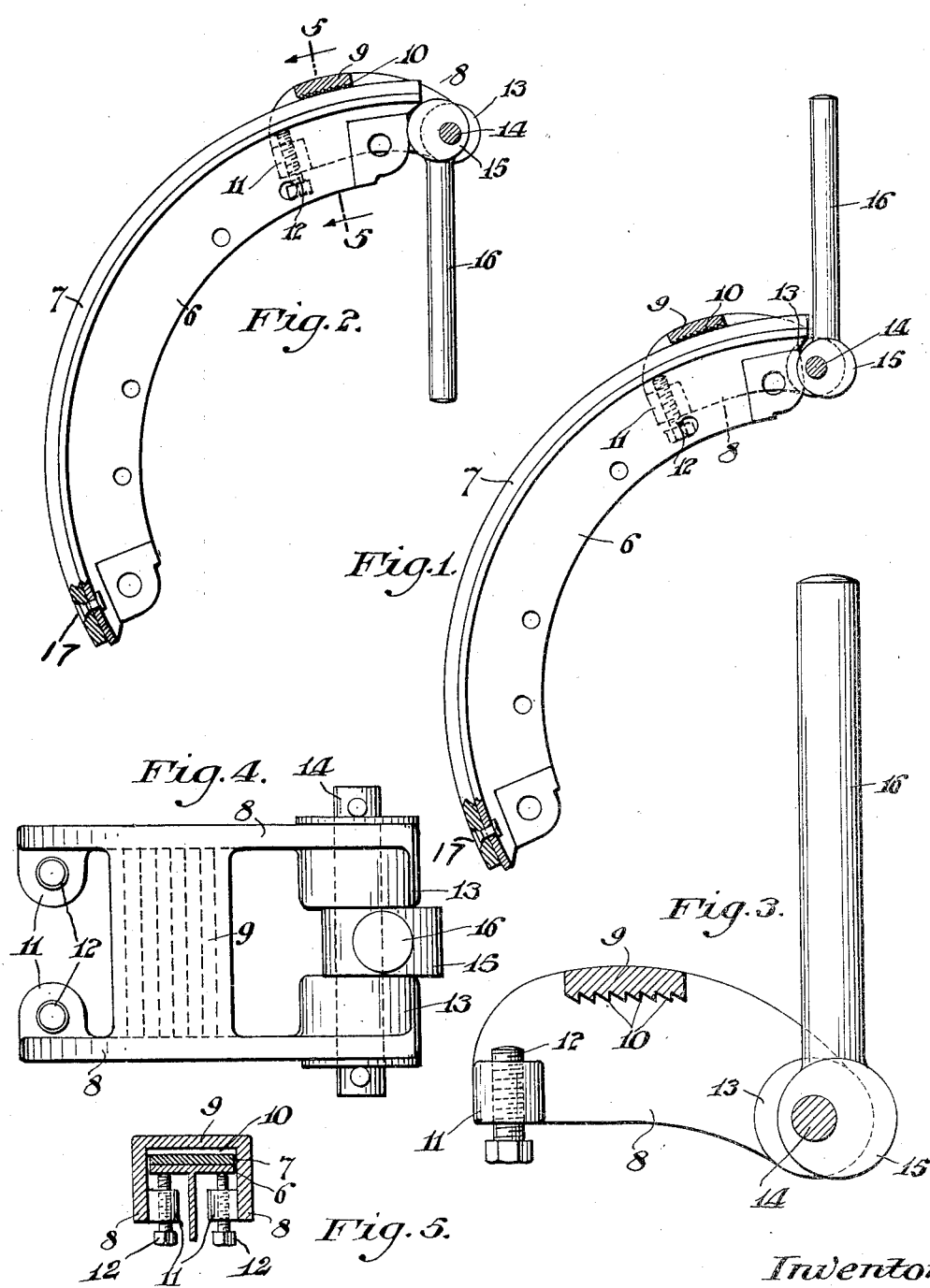
Inventor.
John Mark Culley, Jr.
By Jas. C. Hobwsmith
Attorney.

Patented Mar. 15, 1932

1,849,660

UNITED STATES PATENT OFFICE

JOHN MARK CULLEY, JR., OF GLENSIDE, PENNSYLVANIA

BRAKE LINING STRETCHER

Application filed June 8, 1929. Serial No. 369,503.

My invention relates to stretchers for brake linings, that is to say, to devices for applying brake linings to the shoes which are employed in connection with the brakes of automobiles and the like.

The principal object of my invention is to provide a simple and efficient, yet inexpensive, device for stretching brake linings over the shoes during the process of riveting the same thereto.

A further object of my invention is to provide such a tool which may be quickly and easily applied, and which will insure the proper register of the brake lining with the outer portion of the brake shoe.

The nature and characteristic features of my invention will be more readily understood from the following description, taken in connection with the accompanying drawings forming part hereof, in which:

Figure 1 is a side elevation, partly in section, showing a common type of brake shoe with the brake lining secured thereto at one end, and having a device embodying the main features of my present invention shown at the other end thereof, the various parts of the same being in the initial positions assumed before the stretching and clamping takes place;

Fig. 2 is a view similar to Fig. 1, but with the parts of the stretching and clamping device shown in the operative positions;

Fig. 3 is a longitudinal section of the device, enlarged;

Fig. 4 is a top or plan view thereof, on the same scale as Fig. 3; and

Fig. 5 is a section taken on the line 5—5 of Fig. 2.

It will, of course, be understood that the drawings and description herein contained are illustrative merely, and that various modifications and changes may be made in the structure disclosed without departing from the spirit of my invention.

Referring to the drawings, 6 is a brake shoe of a well known type, comprising a sector member of T-shaped cross section, upon the outer or convex face of which the brake lining 7 is applied.

The stretching and clamping device of my invention may comprise a frame having side portions 8 connected by a transverse portion 9. The inner face of the member 9 is notched to provide teeth or serrations 10, which are adapted to engage the brake lining 7 in the manner and for the purpose to be presently described.

Extending from the inner faces of the side portions 8, near one end thereof are lugs 11, in which set screws 12 may be threaded. The ends of the set screws are adapted to engage the inner faces of the outer portions of the brake shoe 6.

Each of the side members 8, near the other end thereof, is provided with an inwardly extending boss 13, through which bosses a pin 14 extends. An eccentric 15 is journaled with respect to the frame by means of the pin 14, which also extends through the eccentric 15. The eccentric 15 is provided with an operating handle 16.

In the operation of the device, one end of the brake lining is first secured to the brake shoe by means of rivets 17, the lining 7 being then laid over the outer face of the brake shoe 6.

The stretching and clamping device of my invention is then placed upon the other end of the brake shoe and lining, being pushed inwardly until the eccentric bears against the end of the brake shoe. At this stage the eccentric and its operating handle are in the positions shown in Fig. 1 of the drawings. The set screws 12 are adjusted to the proper positions to bear against the inner surfaces of the outer portions of the brake shoe 6 when the device is placed upon the same.

The operating handle 16 is now swung to the position shown in Fig. 2 of the drawings, whereupon the teeth 10 of the transversely extending bar 9 will be caused to bite into the brake lining and then stretch the same tightly over the outer face of the brake shoe, the action of the eccentric being such as to cause the frame first to bear downwardly and then to move forwardly to effect the stretching.

The parts of the device may be left in the clamping position during the operation of riveting the remaining portions of the lining to the brake shoe, which may be done in the customary manner.

It will be noted that the inner faces of the side members 8 of the frame of the device are spaced a distance corresponding to the width of the brake shoe and lining, whereby the end of the lining which is gripped by the device will be maintained in proper register upon the surface of the shoe.

It will be seen that there is thus provided a simple, inexpensive, and easily manipulated device which will effectively stretch and hold the lining upon the outer surface of the brake shoe while the same is being riveted thereto. It will also be noted that no particular skill will be required in the use of the device, and that the same will not interfere in any way with the drilling of the lining and the application of the fastening rivets.

I claim:—

1. A device for stretching and holding brake linings with respect to brake shoes, comprising a framework having side members the inner faces of which are spaced a distance corresponding to the width of the brake shoe and lining thereby to aline the side edges of the lining with the side edges of the brake shoe, a member having its inner face serrated to engage the brake lining, other members adapted to engage portions of the brake shoe, and means for causing the serrated member to engage one end of the brake lining and to stretch the same over the outer face of the brake shoe.

2. A device for stretching and holding brake linings with respect to brake shoes, comprising a framework having side members the inner faces of which are spaced a distance corresponding to the width of the brake shoe and lining, a transverse member connecting said side members and having its inner face serrated to engage the brake lining, members adapted to engage the inner faces of the outer portion of the brake shoe, and means for causing the serrated members to engage one end of the brake lining and to stretch the same over the outer surface of the brake shoe.

3. A device for stretching and holding brake linings with respect to brake shoes, comprising a framework having side members the inner faces of which are spaced a distance corresponding to the width of the brake shoe and lining, a transverse member connecting said side members and having its inner face serrated to engage the brake lining, set screws carried at one end of the side members adapted to engage the inner faces of the outer portion of the brake shoe, and means for causing the serrated member to engage one end of the brake lining and to stretch the same over the outer surface of the brake band.

4. A device for stretching and holding brake linings with respect to brake shoes, comprising a framework having side members, a transverse member connecting said side members and having its inner face serrated to engage the brake lining, members adapted to engage under portions of the brake shoe, an eccentric journaled at one end of the side members and adapted to engage the end of the brake shoe, and means for rotating said eccentric.

5. A device for stretching and holding brake linings with respect to brake shoes, comprising a framework having side members, a transverse member connecting said side members and having its inner face serrated to engage the brake lining, members carried at one end of the side members adapted to engage portions of the brake shoe, an eccentric journaled at the other end of the side members and adapted to engage the end of the brake shoe, and means for rotating said eccentric.

6. A device for stretching and holding brake linings with respect to brake shoes, comprising a framework having side members, a transverse member connecting said side members and having its inner face serrated to engage the brake lining, members carried at one end of the side members adapted to engage portions of the brake shoe, an eccentric journaled at the other end of the side members and adapted to engage the end of the brake shoe, and an operating handle extending from said eccentric.

7. A device for stretching and holding brake linings with respect to brake shoes, comprising a framework having side members, a transverse member connecting said side members and having its inner face serrated to engage the brake lining, set screws carried at one end of the side members adapted to engage the inner faces of the outer portion of the brake shoe, an eccentric journaled at the other end of the side members and adapted to engage the end of the brake shoe, and an operating handle extending from said eccentric.

8. A device for stretching and holding brake linings with respect to brake shoes, comprising a framework having side members the inner faces of which are spaced a distance corresponding to the width of the brake shoe and lining, a transverse member connecting said side members and having its inner face serrated to engage the brake lining, set screws carried at one end of the side members adapted to engage the inner faces of the outer portion of the brake shoe, an eccentric journaled at the other end of the side members and adapted to engage the end of the brake shoe, and an operating handle extending from said eccentric.

In testimony whereof I have hereunto signed my name.

JOHN MARK CULLEY, Jr.